United States Patent [19]

Musch et al.

[11] 4,303,765
[45] Dec. 1, 1981

[54] PROCESS FOR THE PRODUCTION OF STORABLE 2-CHLORO-1,3-BUTADIENE/SULFUR COPOLYMERS

[75] Inventors: Rüdiger Musch; Rüdiger Schubart, both of Bergisch-Gladbach; Wilhelm Göbel; Gottfried Pampus, both of Leverkusen, all of Fed. Rep. of Germany

[73] Assignee: Bayer Aktiengesellschaft, Fed. Rep. of Germany

[21] Appl. No.: 159,770

[22] Filed: Jun. 6, 1980

[30] Foreign Application Priority Data

Jun. 19, 1979 [DE] Fed. Rep. of Germany ....... 2924660

[51] Int. Cl.³ .......................... C08C 19/20; C08F 8/34
[52] U.S. Cl. ..................... 525/343; 525/330; 525/348; 260/29.7 AT; 260/29.7 SQ
[58] Field of Search ................... 525/343, 330, 348; 260/29.6 Z, 29.7 AT, 29.7 SQ

[56] References Cited

U.S. PATENT DOCUMENTS

| | | | |
|---|---|---|---|
| 2,234,215 | 3/1941 | Youker et al. | 260/30.2 |
| 3,507,825 | 4/1970 | Paris | 525/343 |
| 3,795,655 | 3/1974 | Le Claire et al. | 525/343 |
| 3,808,183 | 4/1974 | Branland et al. | 525/343 |
| 3,816,323 | 6/1974 | Kempermann et al. | 525/343 |
| 3,852,250 | 12/1974 | Maxey | 525/343 |
| 4,051,078 | 9/1977 | Kato et al. | 525/343 |
| 4,124,754 | 11/1978 | Miller | 525/343 |

FOREIGN PATENT DOCUMENTS 1040954 9/1966 United Kingdom .

*Primary Examiner*—William F. Hamrock
*Attorney, Agent, or Firm*—Connolly and Hutz

[57] ABSTRACT

A process for the production of storable 2-chloro-1,3-butadiene/sulphur copolymers by peptization using sulphur containing petizing agents, wherein a compound corresponding to the following general formula:

$$R_1-S_n-R_1$$

wherein
n represents an integer having a value of from 2 to 10, preferably from 3 to 8 and, more particularly, from 4 to 6; and $R_1$ represents a $C_6-C_{14}$ aryl radical, a $C_6-C_{14}$ aryl-$C_1-C_3$ alkyl radical or a heterocycle containing from 1 to 3 hereto atoms, such as N, which may be the same or different and which may optionally be substituted;

optionally in combination with a nucleophilic substance, is added to the latex and peptized at from 5° to 100° C. and at pH of from 14 to 3.

4 Claims, No Drawings

PROCESS FOR THE PRODUCTION OF STORABLE 2-CHLORO-1,3-BUTADIENE/SULFUR COPOLYMERS

This invention relates to a process for the production of storable 2-chloro-1,3-butadiene/sulphur copolymers in the presence of sulphur-containing peptising agents.

The production of 2-chlorobutadiene/sulphur copolymers is normally carried out in aqueous emulsion, optionally in the presence of other copolymerisable monomers containing a vinyl or vinylidene group, such as 2,3-dichlorobutadiene, 1-chlorobutadiene or methacrylic acid, as comonomer. The molecular weight of these polymers is generally adjusted by a so-called "peptisation" step carried out after polymerisation rather than by adding a regulator during polymerisation. In this context, "peptisation" is to be understood to be the splitting of the polymer chains at the sulphur segments thereof. This step is necessary in order to guarantee trouble-free processing of the solid rubber. The frequently used peptising agent, tetraethyl thiuram disulphide (TETD), may be combined with certain nucleophilic substances, such as amines or dithiocarbamates (German Offenlegungsschrift No. 2,018,736). The latex obtained after polymerisation is normally peptised at from 40° to 70° C. The peptisation velocity is determined, inter alia, by the quantity in which the peptising agent, such as tetraethyl thiuram disulphide (TETD), is used, by the type and quantity of nucleophilic substance used and by the temperature. The peptisation time is normally from 2 to 20 hours. However, for economic reasons and in order to suppress secondary reactions, rapid peptisation is required. However, it is difficult to control and monitor. In addition, the degradation process generally continues in the peptised latex, even at low storage temperatures, with the result that the latex has to be worked-up into the solid rubber as quickly as possible.

Another method of producing 2-chloro-1,3-butadiene/sulphur copolymers having technologically favourable Mooney viscosities involves regulating the polymerisation reaction using xanthogen disulphides (German Offenlegungsschrift No. 2,213,116). However, a disadvantage of this method also resides in the fact that the thus-obtained copolymers are not sufficiently stable in storage. Although it has been proposed (U.S. Pat. No. 3,766,121) to improve the storage stability thereof by adding certain quantities of sulphite or thiosulphate to the latex, a degree of dependence on the storage time exists in this case, too.

According to German Offenlegungsschrift No. 2,134,158, 2-chloro-1,3-butadiene/sulphur copolymers are peptised by the addition of thiols, such as n-dodecyl mercaptan, to the final latex. Although this process starts out from a copolymer which has already been regulated by modifying agents, such as dialkyl xanthogen disulphide, and of which the solid rubber has a Mooney viscosity of from 60 to 100, considerable quantities of mercaptan are still necessary for peptisation. In addition, this peptisation is only possible in the case of an alkaline latex having a pH in excess of 9.5.

It was therefore surprising to find that even small quantities of a diaryl polysulphide are sufficient to degrade an unregulated sulphur-modified polychloroprene having a high Mooney viscosity very rapidly to a technologically favourable Mooney viscosity of from 40 to 50 ME. This process takes place quickly not only in the alkaline pH range, but also in the acidic pH range.

Accordingly, the present invention relates to a process for the production of storable 2-chloro-1,3 butadiene/sulphur copolymers by peptisation using sulphur-containing peptising agents which is characterised in that a compound corresponding to the following general formula:

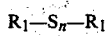

wherein
n represents an integer having a value of from 2 to 10, preferably from 3 to 8 and, more particularly, from 4 to 6; and
$R_1$ represents a $C_6$–$C_{14}$ aryl radical, a $C_6$–$C_{14}$ aryl-$C_1$–$C_3$-alkyl (aralkyl) radical or a heterocycle containing from 1 to 3 hetero atoms, such as N, which may be the same or different and which may optionally be substituted;

optionally in combination with a nucleophilic substance, is added to the latex and peptised at a temperature of from 5° to 100° C. and at a pH of from 14 to 3.

The aryl radical may be, for example, a phenyl, naphthyl or anthranyl radical, the aralkyl radical may be a benzyl radical and the heterocycle may be imidazolyl, triazolyl, thiazolyl, triazinyl, pyrimidyl, diazinyl or pyridyl. The heterocycle may even by part of a polycyclic aromatic ring system, such as indolyl, benzodihydroquinolinyl, benzthiazolyl, benztriazolyl or benzimidazolyl.

The radical $R_1$ may be substituted by one or more (preferably up to 5) times by straight- or branched chain saturated or unsaturated $C_1$–$C_{18}$, preferably $C_1$–$C_9$ and, more particularly, $C_1$–$C_4$, alkyl groups; $C_4$–$C_{10}$ cycloalkyl or cycloalkenyl; $C_6$–$C_{14}$ aryl, $C_1$–$C_8$ alkyloxy; $C_6$–$C_{14}$ aryloxy; halogen (F, Cl, Br, I); halogenated $C_1$–$C_4$ alkyl, such as chloromethyl, trichloromethyl or trifluoromethyl; carboxyl; $C_1$–$C_8$ alkoxy carbonyl; amino; mono or $C_9$–$C_8$ dialkyl amino; $C_6$–$C_{14}$ arylamino, such as phenylamino or tolylamino; or 1-2 nitro groups.

Preferred substituents include: alkyl, aryl, alkyloxy, aryloxy, nucleus halogen, carboxyl, alkoxycarbonyl;

Particularly preferred substituents for $R_1$ include aryl and aralkyl which may optionally be substituted one or more times by alkyl, halogen (Cl, Br), alkyloxy, aryloxy, carboxyl and/or alkoxy carbonyl.

$R_1$ is in particular a phenyl radical.

Suitable alkyl substituents include; methyl, ethyl, n-propyl, isopropyl, n-butyl, isobutyl, t-butyl, n-butyl, isopentyl, t-pentyl, propenyl, butylenyl, hexyl, isohexyl, t-hexyl, n-hexyl, heptyl, octyl, 2-ethyl-hexyl, dodecyl, undecyl, decyl, tridecyl, tetradecyl, pentadecyl, hexadecyl, heptadecyl and octadecyl. Suitable cycloalkyl or cycloalkenyl substituents include: cyclobutyl, cyclopentyl, cyclohexyl, cycloheptyl, cyclohexenyl, cyclooctyl, cyclononyl and cyclodecyl.

$R_1$ may be phenyl, o, p-methyl phenyl, o-, m-, p-chlorophenyl, o-, m-, p-carboxyl phenyl, o-, m-, p-fluorophenyl, o-, m-, p-bromophenyl, o-, m-, p-nitrophenyl, o-, m-, p-dimethyl aminophenyl, o-, m-, p-diethylaminophenyl, o-, m-, p-methoxy carbonyl phenyl, o-, m-, p-methoxy phenyl, o-, m-, p-ethoxy phenyl, o-, m-, p-phenoxy phenyl, o-, m-, p-diphenyl phenyl, o-, m-, p-trifluoromethyl phenyl, o-, m-, p-trichloromethyl phenyl, o-, m-, p-chloromethyl phenyl, o-, m-, p-ethoxy carbonyl phenyl, o-, m-, p-ethyl phenyl, o-, m-, p-propyl phenyl, o-, m-, p-isopropyl phenyl, o-, m-, p-butyl phenyl, o-, m-, p-pentyloxy phenyl, o-, m-, p octyloxy phenyl, o-, m-, p-butoxy carbonyl phenyl, o-, m-, p-octyloxy carbonyl phenyl, o-, m-, p-cyclohexyl phenyl, o-, m-, p-cycloheptyl phenyl, o-, m-, p-cyclobutyl phenyl, o-, m-, p-phenylamino phenyl, diphenyl, naphthalyl or anthralyl.

Reference may also be made to benzthiazolyl, 3,4-dimethyl thiazolyl, thiazolyl, triazolyl, benztriazolyl, benzimidazolyl, imidazolyl, triazinyl, dialkyl triazinyl, bis-dialkylamino-triazinyl, bis-alkylamino-triazinyl, pyrimidyl, diazinyl and pyridyl.

These heterocycles generally have a 5 or 6 membered ring.

The above-mentioned, extremely effective peptising agents may be produced in accordance with the following scheme (Otto, J. Pr. [2] 37, 208):

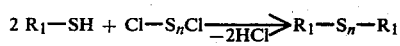

$$2 R_1-SH + Cl-S_nCl \xrightarrow{-2HCl} R_1-S_n-R_1$$

When n represents 2, the synthesis may be carried out by oxidising a mercapto aryl compound with an oxidising agent of the type described in the literature.

A number of exemplary compounds wherein n represents from 2 to 10 which may be produced in accordance with this synthesis and which may be used as peptising agents are listed below:

bis-(phenyl)-disulphide
bis-(phenyl)-trisulphide
bis-(phenyl)-tetrasulphide
bis-(phenyl)-pentasulphide
bis-(phenyl)-hexasulphide
bis-(phenyl)-heptasulphide
bis-(phenyl)-octasulphide
bis-(phenyl)-nonasulphide
bis-(phenyl)-decasulphide
bis-(2-methylphenyl)-disulphide
bis-(2-methylphenyl)-trisulphide
bis-(2-methylphenyl)-tetrasulphide
bis-(2-methylphenyl)-pentasulphide
bis-(3-methylphenyl)-disulphide
bis-(3-methylphenyl)-trisulphide
bis-(3-methylphenyl)-tetrasulphide
bis-(3-methylphenyl)-pentasulphide
bis-(4-methylphenyl)-disulphide
bis-(4-methylphenyl)-trisulphide
bis-(4-methylphenyl)-tetrasulphide
bis-(2,4-dimethylphenyl)-disulphide
bis-(1,2-dimethylphenyl)-disulphide
bis-(1,2-dimethylphenyl)-trisulphide
bis-(1,2,-dimethylphenyl)-tetrasulphide
bis-(1,6-dimethylphenyl)-disulphide
bis-(1,6-dimethylphenyl)-trisulphide
bis-(1,6-dimethylphenyl)-tetrasulphide
bis-(1,4-dimethylphenyl)-disulphide
bis-(1,4-dimethylphenyl)-trisulphide
bis-(1,4-dimethylphenyl)-tetrasulphide
bis-(2,4-dimethylphenyl)-trisulphide
bis-(2,4-dimethylphenyl)-tetrasulphide
bis-(2,4,6-trimethylphenyl)-disulphide
bis-(2,4,6-trimethylphenyl)-trisulphide
bis-(2,4,6-trimethylphenyl)-tetrasulphide
bis-(4-ethylphenyl)-disulphide
bis-(4-ethylphenyl)-trisulphide
bis-(4-ethylphenyl)-tetrasulphide
bis-(4-isopropyl-phenyl)-disulphide
bis-(4-isopropyl-phenyl)-trisulphide
bis-(4-isopropyl-phenyl)-tetrasulphide
bis-(4-t-butylphenyl)-disulphide
bis-(4-t-butylphenyl)-trisulphide
bis-(4-t-butylphenyl)-tetrasulphide
bis-(4-pentyl-phenyl)-disulphide
bis-(4-pentyl-phenyl)-trisulphide
bis-(4-pentyl-phenyl)-tetrasulphide
bis-(4-hexyl-phenyl)-disulphide
bis-(4-hexyl-phenyl)-trisulphide
bis-(4-hexyl-phenyl)tetrasulphide
bis-(4-octyl-phenyl)-disulphide
bis-(4-octyl-phenyl)-trisulphide
bis-(4-octyl-phenyl)-tetrasulphide
bis-(4-nonyl-phenyl)-disulphide
bis-(4-nonyl-phenyl)-trisulphide
bis-(4-nonyl-phenyl)-tetrasulphide
bis-(decylphenyl)-tetrasulphide
bis-(4-dodecyl-phenyl)-disulphide
bis-(4-dodecyl-phenyl)-trisulphide
bis-(4-dodecyl-phenyl)-tetrasulphide
bis-(4-tetradecyl-phenyl)-disulphide
bis-(4-tetradecyl-phenyl)-trisulphide
bis-(4-tetradecyl-phenyl)-tetrasulphide
bis-(4-octadecyl-phenyl)-disulphide
bis-(4-octadecyl-phenyl)-trisulphide
bis-(4-octadecyl-phenyl)-tetrasulphide
bis-(2-methoxy-phenyl)-disulphide
bis-(2-methoxy-phenyl)-trisulphide
bis-(2-methoxy-phenyl)-tetrasulphide
bis-(4-methoxy-phenyl)-disulphide
bis-(4-methoxy-phenyl)-trisulphide
bis-(4-methoxy-phenyl)-tetrasulphide
bis-(4-ethoxy-phenyl)-disulphide
bis-(4-ethoxy-phenyl)-trisulphide
bis-(4-ethoxy-phenyl)-tetrasulphide
bis-(4-cyclohexyl-phenyl)-disulphide
bis-(4-cyclohexyl-phenyl)-trisulphide
bis-(4-cyclohexyl-phenyl)-tetrasulphide
bis-(4-diphenyl)-disulphide
bis-(4-diphenyl)-trisulphide
bis-(4-diphenyl)-tetrasulphide
bis-(2- or 3- or 4-phenoxyphenyl)-disulphide
bis-(phenoxyphenyl)-trisulphide
bis-(phenoxyphenyl)-tetrasulphide
bis-(4-chlorophenyl)-disulphide
bis-(4-chlorophenyl)-trisulphide
bis-(4-chlorophenyl)-tetrasulphide
bis-(3-trifluoromethylphenyl)-disulphide
bis-(3-trifluoromethylphenyl)-trisulphide
bis-(3-trifluoromethylphenyl)-tetrasulphide
bis-(2-methoxycarbonyl-phenyl)-disulphide
bis-(2-methoxycarbonyl-phenyl)-trisulphide
bis-(2-methoxycarbonyl-phenyl)-tetrasulphide
bis-(4-dimethylamino-phenyl)-disulphide
bis-(4-dimethylamino-phenyl)-trisulphide
bis-(4-dimethylamino-phenyl)-tetrasulphide
bis-(4-phenylaminophenyl)-disulphide
bis-(4-phenylaminophenyl)-trisulphide
bis-(4-phenylaminophenyl)-tetrasulphide
bis-(benzthiazolyl)-disulphide
bis-(benzthiazolyl)-trisulphide
bis-(benzthiazolyl)-tetrasulphide
bis-(3,4-dimethylthiazolyl)-disulphide
bis-(3,4-dimethylthiazolyl)-trisulphide
bis-(3,4-dimethylthiazolyl)-tetrasulphide
bis-(triazyl)-disulphide
bis-(triazyl)-trisulphide bis-(triazyl)-tetrasulphide
bis-(bis-dimethylamino-triazinyl)-disulphide
bis-(bis-dimethylamino-triazinyl)-trisulphide
bis-(bis-dimethylamino-triazinyl)-tetrasulphide
bis-(ethylamino-diethylamino-triazinyl)-disulphide
bis-(ethylamino-diethylamino-triazinyl)-trisulphide
bis-(ethylamino-diethylamino-triazinyl)-tetrasulphide
bis-(pyrimidyl)-disulphide
bis-(pyrimidyl)-trisulphide
bis-(pyrimidyl)-tetrasulphide
bis-(pyridyl)-disulphide
bis-(quinolyl)-disulphide
bis-(quinolyl)-disulphide
bis-(quinolyl)-tetrasulphide The synthesis of bis-(phenyl)-tetrasulphide is exemplified in the following. Other compounds may be similarly produced.

Synthesis of bis-phenyl-tetrasulphide:

33.0 kg (244.5 moles, 98.3%) of disulphur dichloride were added, dropwise, while stirring and cooling with water, at from 20° to 30° C., to 55 kg (500 moles) of thiolphenol. The hydrochloric acid gas escaping was conducted into a washing tower. After all the disulphur dichloride had been added, the internal temperature was slowly increased to 60° C. and the mixture stirred at that temperature until the evolution of HCl had abated. The reaction mixture was then stirred first in a water jet vacuum and then in a high vacuum. 0.4 kg of thiolphenol were recovered, the receiver being cooled using methanol/dry ice. 69.0 kg (i.e. 98% of the theoretical yield) of yellow, oily, non-distillable bis-phenyl-tetrasulphide were obtained. Its refractive index could not be measured on account of its intense colour.

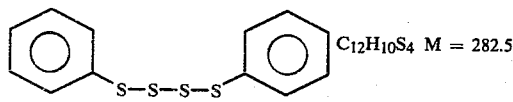

| C | calculated | 51.0 | observed | 50.8% |
|---|---|---|---|---|
| H | | 3.6 | | 3.8% |
| S | | 45.4 | | 45.5% |

The proof of identity of further batches was established by IR comparison.

Polymers having technologically favourable Mooney viscosities may be obtained by adding the compounds according to the present invention to latices thereof in concentrations of from 0.1 to 10, preferably from 0.2 to 5 and, more particularly, from 0.5 to 3, millimoles per 100 g of polymer either during or after polymerisation and before or after removal of the monomer.

Nucleophilic substances, such as primary or secondary amines containing $C_1$–$C_4$ alkyl, sulphides or dithionites, additionally accelerate peptisation, although they do not have to be added. The nucleophilic substance should be added in at most equimolar quantities, based on the diaryl polysulphide.

The polymer latices are peptised at temperatures of from 5° to 100° C., preferably from 15° to 65° C. and, more particularly, from 30° to 55° C., and at pH values of from 14 to 3, preferably from 13 to 5 and, more particularly, from 12 to 6. For economic reasons, peptisation is carried out during removal of the monomer from the latex, for example by steam distillation or during storage.

The residence time of the latex after peptisation pending working-up often amounts to several hours. During this period, the viscosity of the alkaline dispersions has to remain stable. Accordingly, it is a significant advance that the latices peptised using the reagents described above may be stored for several days without alterations in the viscosity thereof. By virtue of this stability of viscosity, it is possible to peptise highly viscous sulphur-modified polychloroprenes in steps in order specifically to adjust a certain viscosity range. This was not possible by the previous method of peptisation using thiuram disulphides.

The latex is worked-up in known manner by low temperature coagulation, followed by drying, as described in German Offenlegungsschrift No. 1,807,298.

Another important criterion for sulphur-modified polychloroprenes is that the peptised solid rubber should show good mastication behaviour on mixing rolls. "Mastication behaviour" is to be understood to be the further reduction of the molecular weight of the crude polymer during processing on mixing rolls or in kneaders. As known to those skilled in the art, the mastication behaviour of the solid rubber is improved by the addition of thiuram disulphides which are added just before working-up. Accordingly, it is surprising that the polymers peptised using polysulphides even worked-up without further additions show favourable mastication behaviour.

The chloroprene/sulphur copolymers preferably have a sulphur content of from 0.1 to 2.0%, by weight, and, more particularly, from 0.2 to 0.5%, by weight. Based on 100 parts by weight of chloroprene monomer up to 30 parts by weight of a copolymerizable monomer such as dichlorobutadien; chlorobutadien and methacrylic acid can be added.

The present invention is illustrated by the following Examples.

EXAMPLE 1

The sulphur-modified polychloroprene latex is produced in an aqueous emulsion system.

The reaction components are made up as follows:

| | | parts, by weight |
|---|---|---|
| (a) | Monomer phase | |
| | chloroprene | 97 |
| | dichlorobutadiene | 3 |
| (b) | Aqueous phase | |
| | desoxygenated water | 150 |
| | disproportionated resinic acid | 4.5 |
| | salt of a naphthalene sulphonic acid/formaldehyde condensation product | 0.5 |
| | sodium hydroxide | 0.5 |
| | anhydrous sodium pyrophosphate | 0.5 |
| | triisopropanolamine | 0.5 |
| | sulphur dispersion (50% by weight) | 1.4 |
| | Catalyst solution | |
| | desoxygenated water | 70 |
| | potassium persulphate | 1.0 |
| | β-anthraquinone sulphonic acid | 0.05 |

The emulsion is purged with nitrogen, heated to 40° C. and polymerisation started by the addition of a small quantity of a dilute potassium persulphate solution. During the polymerisation reaction, more persulphate solution is introduced at such a rate that the temperature of the mixture does not exceed 40° C. After a monomer conversion of approximately 65% has been reached, polymerisation is stopped by the addition of 0.1 part of phenothiazine, the excess monomer is separated off under reduced pressure using superheated steam and the latex is peptised by the addition of 0.4 part of diphenyl tetrasulphide and 0.1 part of K₂S. After heating for 30 minutes to 45° C., the latex is cooled and worked-up by low temperature coagulation on mixing rolls. The rubber has a Mooney viscosity of 42 ME. In order rapidly to determine the solution viscosity of the polymer, the latex is precipitated in acetone and a 5% by weight solution in THF prepared. Viscosity is measured by means of a Brookfield viscosimeter.

EXAMPLE 2

(Influence of the Peptisation Time)

The sulphur-modified polychloroprene latex is prepared as in Example 1 and peptised at 45° C. using 0.5 millimole of diphenyl tetrasulphide and 0.5 millimole of $K_2S$, based on 1 mole of the monomeric chloroprene used. The following solution viscosities are obtained for the peptised latex.

| Peptisation time (h) | Solution viscosity of a 5% by weight solution (cps) |
|---|---|
| 0 | 10,000 |
| ½ | 25 |
| 2 | 25 |
| 3 | 24.5 |
| 4 | 24 |
| 5 | 24 |
| 6 | 23 |
| 8 | 23 |

EXAMPLE 3

(Comparison Example)

The procedure is as in Example 2, except that, instead of diphenyl tetrasulphide, an equimolar quantity of tetraethyl thiuram disulphide and $K_2S$ is used for peptisation under the same conditions.

| Peptisation time (h) | Viscosity of a 5% by weight solution (cps) |
|---|---|
| 1 | 140 |
| 2 | 117 |
| 3 | 100 |
| 4 | 88 |
| 5 | 76 |
| 6 | 67 |
| 8 | 54 |

EXAMPLE 4

(Influence of pH)

The latex prepared in accordance with Example 1 is peptised at different pH values using 1.5 millimoles of diphenyl tetrasulphide and $K_2S$, based on 1 mole of the monomeric chloroprene used, in the same way as described in Example 1. The following solution viscosities are obtained:

| No. | pH of the latex | Solution viscosity of a 5% by weight solution (cps) |
|---|---|---|
| a | 10 | 7 |
| b | 9 | 10 |
| c | 8 | 11.6 |
| d | 7 | 14.5 |
| e | 6 | 15.0 |
| f | 5 | 17.0 |

EXAMPLE 5

The polychloroprene produced in the same way as described in Example 1 is stopped on completion of the polymerisation reaction and, before the residual monomer is removed using steam, diphenyl tetrasulphide is added. The solution viscosity of the polymer is measured after cooling of the degassed latex. The data are set out in the following Table:

| No. | a | b | c | d |
|---|---|---|---|---|
| diphenyl tetrasulphide (DPTS) (*) | 1.3 | 1.3 | 1.3 | 0.6 |
| dibutyl amine | — | 0.6 | — | — |
| K₂S | — | — | 0.6 | — |
| solution viscosity immediately after removal of the monomer | 37 | 40 | 35 | 40 |
| solution viscosity after 24 hours at room temperature | 30 | 38 | 35 | 39 |

(*) in mMole per mole of chloroprene monomer used

EXAMPLE 6

(Comparison Example)

Peptisation of the polymer in latex form is carried out in the same way as in Example 5, except that tetraethyl thiuram disulphide (TETD) is used as the peptising agent.

| No. | a | b | c | d | e |
|---|---|---|---|---|---|
| TETD | 1.3 | 1.3 | 1.3 | 2.6 | 3.25 |
| dibutyl amine | — | — | 0.6 | 1.2 | 1.2 |
| K₂S | — | 0.6 | — | — | — |
| solution viscosity immediately after removal of the monomer | >10000 | >10000 | >10000 | >10000 | >10000 |
| solution viscosity after 24 hours at room temperature | 134 | 112 | 46 | 217 | 32 |

As may be seen from Examples 1 to 4, degradation of the polymer takes place considerably more quickly where the present peptising agent is used (Example 2) than by the conventional method (Example 3).

While, hitherto, the peptisation of a latex was only possible in alkaline medium, the use of these sulphides also enables degradation of the polymer to be carried out in acidic medium (Example 4). The peptisation step may even be carried out simultaneously with the removal of the residual monomer (Example 5). This method of peptisation, which hitherto has not been possible (Example 6), would appear to be of particular economic interest.

EXAMPLE 7

The polymer latex is prepared and its solution viscosity tested in the same way as described in Example 1. The peptisation activity of the present compounds corresponding to the general formula: $R_1-S_n-R_1$ is exemplified in the following Table:

| No. | $S_n$ (n) | $R_1$ | Solution viscosity of a 5% solution |
|---|---|---|---|
| a | 2 | phenyl | 21 |
| b | 3 | phenyl | 18 |
| c | 4 | phenyl | 12 |
| d | 3 | benzyl | 35 |
| e | 4 | benzyl | 36 |
| f | 3 | p-chlorophenyl | 17 |
| g | 4 | p-chlorophenyl | 15 |
| h | 4 | p-chlorophenyl | 18 |

EXAMPLES 8 to 11

Polymerisation is carried out in the same way as described in Example 1, but using a low sulphur input. For peptisation time of 1 hour at 50° C., rubbers having the following viscosity are obtained after working-up:

| Example No. | 8[1] | 9 | 10[1] | 11 |
|---|---|---|---|---|
| sulphur in the mixture | 0.35 | 0.35 | 0.45 | 0.45 |
| TETD (parts by weight) | 1.3 | 0 | 1.3 | 0 |
| dibutylamine (parts by weight) | 0.2 | 0 | 0.2 | 0 |
| diphenyl tetrasulphide (parts by weight) | 0 | 0.5 | 0 | 0.5 |
| Mooney viscosity (ML-4) | | | | |
| (a) unpeptised (ME) | 160 | 160 | 155 | 155 |
| (b) peptised (ME) | 124 | | 113 | 64 |
| degradation rate | 36 | 72 | 42 | 91 |

[1]comparison tests

EXAMPLE 12

0.5 part of di-(nitrophenyl)-hexasulphide is added at room temperature to the polymer latex produced in accordance with Example 1 and freed from monomer. After stirring, the latex is worked-up into the solid rubber by low temperature coagulation. Measurement of the Mooney viscosity at 100° C. produced a value of 43 ME.

EXAMPLES 13 to 16

Sulphur-modified polychloroprene latex is prepared and peptised in the aqueous emulsion system according to Example 1. The latex was worked-up by low temperature coagulation as described in German Offenlegungsschrift No. 1,807,298. The properties of the crude material are set out in the following Table:

| Example No. | 13[1] | 14[1] | 15 | 16 |
|---|---|---|---|---|
| peptisation with | | | | |
| TETD (parts by weight) | 1.0 | 1.0 | — | — |
| diphenyl tetrasulphide | — | — | 0.4 | 0.4 |
| TETD supplement | 1.2 | 1.2 | 0.4 | 0.4 |
| ML-4 (immediate) (ME) | 52 | 44 | 49 | 42 |
| ML-4 after storage (70° C., 1 day (ME) | 50 | 40 | 48 | 42 |
| ML-4 degradation by mastication (ME) | 45 | 38 | 37 | 32 |
| Δ-value | −7 | −6 | −12 | −10 |

[1]comparison tests.

We claim:

1. A process for producing storable 2-chloro-1,3-butadiene/sulfur copolymer latex by peptization of a highly viscous 2-chloro-1,3-butadiene/sulfur copolymer latex using a sulfur containing peptizing agent wherein as the peptizing agent a compound of the formula $R_1-S_n-R_1$ is added to the highly viscous latex of said copolymer after polymerization and the copolymer is peptized at from 5° to 100° C. at a pH of from 14 to 3, n being an integer of from 4 to 6 and $R_1$ being selected from the group consisting of aryl having 6 to 14 carbon atoms and aralkyl wherein the aryl moiety has from 6 to 14 carbon atoms and the alkyl moiety has from 1 to 3 carbon atoms.

2. A process as claimed in claim 1 wherein the compound of said formula is added in an amount of from 0.1 to 10 millimoles per 100 g of copolymer.

3. A process as claimed in claim 1 wherein the compound of said formula is added in an amount of from 0.2 to 5 millimoles per 100 g of copolymer.

4. A process as claimed in claim 1 wherein a nucleophilic substance is added to said copolymer latex.

* * * * *